US012767867B2

(12) United States Patent
Soga et al.

(10) Patent No.: US 12,767,867 B2
(45) Date of Patent: Oct. 20, 2026

(54) TWO-COMPONENT CURABLE RESIN COMPOSITION AND CURED PRODUCT THEREOF

(71) Applicant: THREEBOND CO., LTD., Hachioji (JP)

(72) Inventors: Tetsunori Soga, Hachioji (JP); Eiji Shimokawa, Hachioji (JP)

(73) Assignee: THREEBOND CO., LTD., Tokyo (JP)

( * ) Notice: Subject to any disclaimer, the term of this patent is extended or adjusted under 35 U.S.C. 154(b) by 528 days.

(21) Appl. No.: 18/551,496

(22) PCT Filed: Mar. 23, 2022

(86) PCT No.: PCT/JP2022/013414
§ 371 (c)(1),
(2) Date: Sep. 20, 2023

(87) PCT Pub. No.: WO2022/215521
PCT Pub. Date: Oct. 13, 2022

(65) Prior Publication Data

US 2024/0174852 A1 May 30, 2024

(30) Foreign Application Priority Data

Apr. 8, 2021 (JP) ................................ 2021-065803

(51) Int. Cl.
*C09J 163/00* (2006.01)
*C08K 5/54* (2006.01)
*C08K 5/56* (2006.01)
*C08L 101/10* (2006.01)
*C09J 11/08* (2006.01)

(52) U.S. Cl.
CPC ............... *C09J 163/00* (2013.01); *C08K 5/54* (2013.01); *C08K 5/56* (2013.01); *C09J 11/08* (2013.01); *C08L 101/10* (2013.01); *C08L 2205/02* (2013.01); *C09J 2463/00* (2013.01)

(58) Field of Classification Search
CPC .... C08L 2205/04; C08L 101/10; C08L 23/18; C08L 23/22
See application file for complete search history.

(56) References Cited

U.S. PATENT DOCUMENTS

2024/0166862 A1* 5/2024 Soga ..................... C08L 101/10

FOREIGN PATENT DOCUMENTS

| | | | | | |
|---|---|---|---|---|---|
| EP | 3757149 | A1 | * | 12/2020 | ........... C08G 59/621 |
| JP | 2007099806 | A | * | 4/2007 | |
| JP | 2007131667 | A | * | 5/2007 | |
| JP | 2009-270069 | A | | 11/2009 | |
| JP | 2011-001492 | A | | 1/2011 | |
| JP | 2015-003950 | A | | 1/2015 | |
| JP | 2016108453 | A | | 6/2016 | |
| WO | 2014/017218 | A1 | | 1/2014 | |

OTHER PUBLICATIONS

Machine translation of JP 2007-099806 (no date).*
Machine translation of JP 2007-131667 (no date).*
Office Action, dated Feb. 3, 2026, which was issued for the corresponding Japan Patent Application No. 2023-512921, 6 pages, with English translation.
Extended European Search Report, dated Jan. 21, 2025, issued for the European Patent Application No. 22784506.2, 6 pages.
International Search Report dated Jun. 7, 2022 for the corresponding patent application No. PCT/JP2022/013414, with English translation.
Office Action, dated Mar. 20, 2026, which was issued for the corresponding Chinese Patent Application No. 202280022682.9, 12 pages, with English translation.

* cited by examiner

*Primary Examiner* — Marc S Zimmer
(74) *Attorney, Agent, or Firm* — LUCAS & MERCANTI, LLP

(57) ABSTRACT

A two-component curable resin composition forms a cured product that is excellent in storage stability, is quickly cured by mixing, and has high elongation and high strength is obtained without using a dibutyltin catalyst. A two-component curable resin composition includes the following agent A and agent B. Agent A is a composition containing component (a) and component (b). Component (a) is a hydrogenated epoxy resin. Component (b) is one or more compounds selected from the group consisting of titanium dialkoxybis(acetylacetonate), titanium tetraisopropoxide, tetra-tertiary-butyl titanate, and an aluminum catalyst. Agent B is a composition containing component (c) and component (d). Component (c) is an organic polymer having two or more hydrolyzable silyl groups. Component (d) is a curing agent for component (a).

11 Claims, No Drawings

TWO-COMPONENT CURABLE RESIN COMPOSITION AND CURED PRODUCT THEREOF

CROSS REFERENCE TO RELATED APPLICATION

This Application is a 371 of PCT/JP2022/013414 filed on Mar. 23, 2022, which claimed priority of Japanese Application No. 2021-065803 filed on Apr. 8, 2021, both of which are incorporated herein by reference.

TECHNICAL FIELD

The present invention relates to a two-component curable resin composition and a cured product thereof.

BACKGROUND ART

Conventionally, epoxy resins are excellent in adhesive force, sealability, high strength, heat resistance, electrical characteristics, and chemical resistance, and thus have been used in various applications such as adhesives, sealing agents, sealants, potting agents, coating agents, and conductive pastes. However, there has been a problem that a cured product of such an epoxy resin exhibits strong mechanical strength, but elongatability is poor.

Therefore, blending a modified silicone-based polymer is performed for the purpose of imparting elongatability to an epoxy resin. As such a technique, JP 2007-099806 A discloses a two-component curable resin composition including liquid A in which an epoxy resin and a curing catalyst of a modified silicone-based polymer are blended, and liquid B in which a modified silicone-based polymer having an alkoxysilyl group at the terminal and an epoxy resin curing agent are blended.

SUMMARY OF INVENTION

Technical Problem

However, the two-component curable resin composition disclosed in JP 2007-099806 A uses a dibutyltin catalyst as a curing agent for a modified silicone resin. Since, with the dibutyltin catalyst, an environmental load is large, there is a movement to regulate the use in various countries. Therefore, an alternative catalyst for the dibutyltin catalyst is strongly demanded.

As the alternative catalyst for the dibutyltin catalyst, a zirconium catalyst, phosphoric acid, and the like are exemplified. However, there has been a problem that, in a resin composition using zirconium, storage stability is poor as shown in Comparative Example 3 of the present description. In addition, there has been a problem that, in a resin composition using phosphoric acid, the catalyst is deactivated by a curing agent for an epoxy resin, and curability after two-liquid mixing is impaired, as shown in Comparative Example 4 of the present description.

An object of the present invention is to provide a two-component curable resin composition from which a cured product that is excellent in storage stability, is quickly cured by mixing, and has high elongation and high strength is obtained without using a dibutyltin catalyst.

Solution to Problem

The gist of the present invention will be described below. In aspects of the present invention, the present invention overcomes the conventional problems described above.

[1] A two-component curable resin composition including the following agent A and agent B.

Agent A: a composition containing component (a) and component (b)

Component (a): a hydrogenated epoxy resin

Component (b): one or more compounds selected from the group consisting of titanium dialkoxybis(acetylacetonate), titanium tetraisopropoxide, tetra-tertiary-butyl titanate, and an aluminum catalyst Agent B: a composition containing component (c) and component (d)

Component (c): an organic polymer having two or more hydrolyzable silyl groups

Component (d): a curing agent for component (a)

[2] The two-component curable resin composition according to [1], comprising 0.1 to 20 parts by mass of the component (b) with respect to 100 parts by mass of the component (c).

[3] The two-component curable resin composition according to [1] or [2], wherein the component (a) is a hydrogenated bisphenol type epoxy resin.

[4] The two-component curable resin composition according to any of [1] to [3], wherein the component (c) contains an organic polymer having a trimethoxysilyl group.

[5] The curable resin composition [5] two-component according to [4], wherein the component (c) contains an organic polymer having a dimethoxysilyl group.

[6] The two-component curable resin composition according to any of [1] to [5], wherein the component (d) is an amine compound that is liquid at 25° C.

[7] The two-component curable resin composition according to any of [1] to [6], wherein the component (b) contains titanium dialkoxybis(acetylacetonate).

[8] The two-component curable resin composition according to [7], wherein the titanium dialkoxybis(acetylacetonate) is titanium diisopropoxybis(acetylacetonate).

[9] The two-component curable resin composition according to any of [1] to [8], wherein the agent A and/or the agent B further contains a silane coupling agent as component (e).

[10] The two-component curable resin composition according to any one of [1] to [9], wherein the agent A further contains an aromatic epoxy resin as component (f).

[11] A cured product obtained by curing the two-component curable resin composition according to any of [1] to [10].

[12] A composite obtained by adhering an adherend with the two-component curable resin composition according to any of [1] to [10].

DESCRIPTION OF EMBODIMENTS

Hereinafter, embodiments of the present invention will be described. Note that the present disclosure is not limited only to the following embodiments. It is to be understood that throughout the present description, singular forms of expression also include the concept of the plural forms thereof unless otherwise stated. Thus, it is to be understood that a singular article (for example, “a”, “an”, “the”, and the like in the case of English) also includes the plural concept thereof unless otherwise stated. In addition, it is to be understood that terms used herein are used in the sense commonly used in the art unless otherwise stated. Thus, unless defined otherwise, all technical terms and scientific terms used herein have the same meaning as commonly understood by one of ordinary skill in the art to which the present invention belongs. In case of conflict, the present description (including definitions) will control. The present invention is not limited the following embodiments, and can be variously modified within the scope of claims. In addition, in the present description, "X to Y" means a range including numerical values (X and Y) described before and after that as a lower limit value and an upper limit value, and means "X or more and Y or less". In addition, each of concentrations "%" shall represent a mass concentration "% by mass" unless otherwise specified, and a ratio is a mass ratio unless otherwise specified. In addition, unless otherwise specified, operations and measurements of physical properties and the like are performed under the conditions of room temperature (20 to 25° C.)/relative humidity 40 to 50% RH.

A two-component curable resin composition according to an embodiment of the present invention includes agent A that is a composition containing component (a) and component (b) described later, and agent B that is a composition containing component (c) and component (d) described later. Furthermore, agent A of the two-component curable resin composition according to an embodiment of the present invention can contain an optional component other than component (a) and component (b), and agent B can contain an optional component other than component (c) and component (d). For example, agent A may contain component (e) and/or component (f), and agent B may contain component (e).

<Two-Component Curable Resin Composition>

The two-component curable resin composition according to an embodiment of the present invention includes the following agent A and agent B.

Agent A: a composition containing component (a) and component (b)

Component (a): a hydrogenated epoxy resin

Component (b): one or more compounds selected from the group consisting of titanium dialkoxybis(acetylacetonate), titanium tetraisopropoxide, tetra-tertiary-butyl titanate, and an aluminum catalyst Agent B: a composition containing component (c) and component (d)

Component (c): an organic polymer having two or more hydrolyzable silyl groups

Component (d): a curing agent for component (a)

According to an embodiment of the present invention, it is possible to provide a two-component curable resin composition from which a cured product that is excellent in storage stability, is quickly cured by mixing, and has high elongation and high strength is obtained without using a dibutyltin catalyst.

<Component (a)>

Agent A of the two-component curable resin composition of the present embodiment contains a hydrogenated epoxy resin as component (a). By combining the hydrogenated epoxy resin with the other components of the present embodiment, the two-component curable resin composition of the present embodiment becomes one from which a cured product that is excellent in storage stability, is quickly cured by mixing agent A and agent B, and further has high elongation and high strength is obtained. As component (a), there is no particular limitation, but for example, a hydrogenated bisphenol A type epoxy resin (also referred to as a hydrogenated bisphenol A type epoxy resin. In the present description, "hydrogenated" is also referred to as "hydrogenated"), a hydrogenated bisphenol type epoxy resin such as a hydrogenated bisphenol F type epoxy resin or a hydrogenated bisphenol E type epoxy resin; a hydrogenated cresol novolac type epoxy resin; a hydrogenated phenol novolac type epoxy resin, or the like is exemplified, and among them, a hydrogenated bisphenol type epoxy resin is preferable, and it is more preferable that component (a) is a hydrogenated bisphenol A type epoxy resin. Regarding component (a), these components can be used alone or by mixing two or more kinds.

As commercially available products of component (a), for example, YX8000 (hydrogenated bisphenol A type epoxy resin), YX8034 (hydrogenated bisphenol A type epoxy resin) (both manufactured by Mitsubishi Chemical Corporation), HBE-100 (hydrogenated bisphenol A type epoxy resin) (manufactured by New Japan Chemical Co., Ltd.), ST-3000 (hydrogenated bisphenol A type epoxy resin) (manufactured by NIPPON STEEL Chemical & Material Co., Ltd.), and the like are exemplified, but the commercially available products of component (a) are not limited thereto. These can be used alone respectively or can be used by mixing two or more kinds.

As the content of component (a) in the two-component curable resin composition of the present embodiment, with respect to 100 parts by mass of component (c), 1 to 500 parts by mass is preferable, 10 to 300 parts by mass is more preferable, 50 to 200 parts by mass is further preferable, and 70 to 150 parts by mass is particularly preferable. Within the above range, the cured product of the two-component curable resin composition according to the present embodiment becomes to have higher elongation and higher strength.

<Component (b)>

Component (b) contained in agent A of the two-component curable resin composition of the present embodiment is one or more compounds selected from the group consisting of titanium dialkoxybis(acetylacetonate), titanium tetraisopropoxide, tetra-tertiary-butyl titanate, and an aluminum catalyst. By combining these components (b) with the other components of the present embodiment, the two-component curable resin composition of the present embodiment becomes one from which a cured product that is excellent in storage stability, is quickly cured by mixing agent A and agent B, and has high elongation and high strength is obtained.

It is preferable that component (b) is one or more compounds selected from the group consisting of titanium dialkoxybis(acetylacetonate), titanium tetraisopropoxide, and an aluminum catalyst from the viewpoint that a cured product that is more excellent in storage stability, is quickly cured by mixing agent A and agent B, and has higher elongation and higher strength is obtained. In addition, from the viewpoint that a cured product that is further quickly cured by mixing agent A and agent B and has sufficiently higher elongation is obtained, it is more preferable that component (b) contains titanium dialkoxybis(acetylacetonate), and at this time, it is further preferable that the titanium dialkoxybis(acetylacetonate) is titanium diisopropoxybis(acetylacetonate). These can be used alone respectively or can be used by mixing two or more kinds.

As commercially available products of component (b), there is no particular limitation, but for example, as the titanium tetraisopropoxide, TA-8 (manufactured by Matsumoto Fine Chemical Co., Ltd.) is exemplified, as the tetra-tertiary-butyl titanate, TA-80 (manufactured by Matsumoto Fine Chemical Co., Ltd.) is exemplified, as the titanium dialkoxybis(acetylacetonate), TC-100, TC-120 (manufactured by Matsumoto Fine Chemical Co., Ltd.), which titanium diisopropoxybis(acetylacetonate), or the like is exemplified, and as the aluminum catalyst, DX-9740 (Shin-Etsu Chemical Co., Ltd.), AMD, ASBD, AIPD, ALCH, ALCH-TR, Aluminum Chelate M, Aluminum Chelate D, Aluminum Chelate A (manufactured by Kawaken Fine Chemicals Co., Ltd.), or the like is exemplified.

As the content of component (b) in agent A of the present embodiment, with respect to 100 parts by mass of component (a), it is preferable that component (b) is 0.1 to 20 parts by mass, it is more preferable that component (b) is 0.5 to 15 parts by mass, it is further preferable that component (b) is 1 to 10 parts by mass, and it is particularly preferable that component (b) is 2 to 5 parts by mass. Within the above range, the cured product of the two-component curable resin composition according to the present embodiment becomes to have sufficiently higher elongation and higher strength.

As the content of component (b) in the two-component curable resin composition of the present embodiment, with respect to 100 parts by mass of component (c) described later, it is preferable that component (b) is 0.1 to 20 parts by mass, it is more preferable that component (b) is 0.3 to 17 parts by mass, it is further preferable that component (b) is 0.5 to 13 parts by mass, and it is particularly preferable that component (b) is 1 to 7 parts by mass. Within the above range, quicker curing is achieved when agent A and agent B are mixed, and storage stability is excellent.

<Component (c)>

Component (c) contained in agent B of the two-component curable resin composition of the present embodiment is an organic polymer having two or more hydrolyzable silyl groups. As component (c), an organic polymer having a dimethoxysilyl group, an organic polymer having a trimethoxysilyl group, an organic polymer having a diethoxysilyl group, or an organic polymer having a triethoxysilyl group is exemplified. These compounds can be one kind alone, or two or more kinds can be used in combination. Among them, it is preferable that component (c) contains an organic polymer having a trimethoxysilyl group, and it is more preferable to use an organic polymer having a dimethoxysilyl group and an organic polymer having a trimethoxysilyl group in combination. When an organic polymer having a dimethoxysilyl group and an organic polymer having a trimethoxysilyl group are used in combination, even without using a dibutyltin catalyst, storage stability of agent B can become more excellent, and further quicker curing can be achieved when agent A and agent B are mixed.

In addition, the hydrolyzable silyl group of component (c) may be bonded to a terminal or a side chain of an organic polymer, but from the viewpoint that a cured product having high elongation and high strength is obtained, those in which a hydrolyzable silyl group is bonded to a terminal of an organic polymer are preferable, and those in which hydrolyzable silyl groups are bonded to both terminals of an organic polymer are more preferable. In addition, from the viewpoint of handling, it is preferable that component (c) is liquid at 25° C. In addition, regarding component (c), one kind may be used alone, or two or more kinds may be mixed and used.

As the organic polymer having a dimethoxysilyl group, for example, polyoxyalkylene containing dimethoxysilyl groups at both terminals, a (meth)acrylic dimethoxysilyl groups at both polymer containing terminals, polyisobutylene containing dimethoxysilyl groups at both terminals, or polyurethane containing dimethoxysilyl groups at both terminals is exemplified. As the organic polymer having a trimethoxysilyl group, for example, polyoxyalkylene containing trimethoxysilyl groups at both terminals, a (meth) acrylic polymer containing trimethoxysilyl groups at both terminals, polyisobutylene containing trimethoxysilyl groups at both terminals, or polyurethane containing trimethoxysilyl groups at both terminals is exemplified. As the organic polymer having a diethoxysilyl group, for example, a (meth)acrylic polymer containing diethoxysilyl groups at both terminals, polyisobutylene containing diethoxysilyl groups at both terminals, or polyurethane containing diethoxysilyl groups at both terminals is exemplified. As the organic polymer having a triethoxysilyl group, a (meth)acrylic polymer containing triethoxysilyl groups at both terminals, polyisobutylene containing triethoxysilyl groups at both terminals, or polyurethane containing triethoxysilyl groups at both terminals is exemplified.

The structure of the organic polymer of component (c) is not particularly limited, but for example, a structure such as polyoxyalkylene, polyester, polycarbonate, polyurethane, polyamide, polyurea, polyimide, polyethylene, polypropylene, polyisobutylene, a (meth)acrylic polymer, polystyrene, polyvinyl chloride, polybutadiene, polyisoprene, polyvinyl butyral, or polyvinyl ether is exemplified. Among them, from the viewpoint that a cured product that is quickly cured by mixing agent and further has high elongation and high strength is obtained, as the structure of the organic polymer of component (c), a structure such as polyoxyalkylene, polyisobutylene, or a (meth)acrylic polymer is preferable, and it is more preferable that the structure is polyoxyalkylene. In addition, the structure of the organic polymer of component (c) may be one kind alone or a mixture of two or more kinds.

As commercially available products of the polyoxyalkylene, SAT010, SAX115, SAT030, SAT030, SAT200, SAT350, SAT400, SAX220, SAX510, SAX530, SAX575, SAX580, SAX710, SAX720, SAX725, SAX750, SAX770, S203, S303, S203H, S303H, S943S, S911S, MA440, MA447, MA451, MA903, MA903M, MA904, S943, MAX923, MAX951, SAX510, SAX520, SAX530, SAX580, and the like (manufactured by KANEKA CORPORATION), ES-S2410, ES-S2420, ES-S3430, ES-S3610, and ES-S3630 (manufactured by AGC Inc.) are exemplified. In addition, as commercially available products of the (meth)acrylic polymer of component (c), SA100S, SA310S, OR100S, and the like (manufactured by KANEKA CORPORATION) are exemplified. In addition, as commercially available products of the polyisobutylene of component (c), EP100S, EP103S, EP303S, EP505S, and the like (manufactured by KANEKA CORPORATION) are exemplified.

Regarding the content of component (c) in the two-component curable resin composition of the present embodiment, with respect to 100 parts by mass of component (a), it is preferable that component (c) is 0.1 to 200 parts by mass, it is more preferable that component (c) is 1 to 150 parts by mass, and it is further preferable that component (c) is in the range of 10 to 120 parts by mass. In addition, when the two-component composition of the present embodiment contains component (f) described later, with respect to 100 parts by mass of the total amount of component (a) and component (f), it is preferable that component (c) is 30 to 200 parts by mass, it is more preferable that component (c) is 50 to 150 parts by mass, and it is further preferable that component (c) is in the range of 70 to 120 parts by mass. Within the above range, a cured product that is quickly cured by mixing agent A and agent B and has high elongation and high strength is obtained.

<Component (d)>

Component (d) contained in agent B of the two-component curable resin composition of the present embodiment is a curing agent for component (a), and is a compound capable of curing a hydrogenated epoxy resin that is component (a) contained in agent A. As component (d), there is no particular limitation as long as component (a) can be cured, but for example, primary amine, secondary amine, tertiary amine, polyamide, imidazole, polymercaptan, an acid anhydride compound, or the like is exemplified. In addition, regarding component (d), these may be used alone, or two or more kinds may be used in combination.

As the primary amine, there is no particular limitation, but an aliphatic primary amine, an alicyclic primary amine, an aromatic primary amine, or the like is exemplified. As the aliphatic primary amine, there is no particular limitation, but ethylenediamine, diethylenetriamine, triethylenetetramine, hexamethylenediamine, or the like is exemplified. In addition, as the alicyclic primary amine, there is no particular limitation, but mensendiamine, isophoronediamine, N-aminoethylpiperazine, diaminodicyclohexylmethane, norbornanediamine, or the like is exemplified. In addition, as the aromatic primary amine, there is no particular limitation, but meta-xylylenediamine, meta-phenylenediamine, diaminodiphenylmethane, diaminodiphenylsulfone, diaminodiethyldiphenylmethane, or the like is exemplified. Incidentally, in the present description, an amino group-containing silane coupling agent is not included in component (d) and shall be treated as component (e) described later.

As the secondary amine or the tertiary amine, there is no particular limitation, but for example, it is 2,4,6-tris(dimethylaminomethyl) phenol, piperidine, pyridine, benzyldimethylamine, 2-(dimethylaminomethyl) phenol, triethylenediamine, dimethylcyclohexylamine, dimethylbenzylamine, dimethylaminomethylphenol, dimethylhexylamine, bis(dimethylaminomethyl) phenol, dimethylaminophenol, or dimethylamino-p-cresol. As the commercially available products, for example, Ancamine K54 (Air Products Japan K.K.) and the like are exemplified. As the secondary amine or the tertiary amine, from the viewpoint that curability is excellent, a compound having an aromatic ring is preferable.

Regarding component (d), from the viewpoint of curability after mixing agent A and agent B and workability, an amine compound that is liquid at 25° C. is preferable. As one that is liquid at 25° C., for example, 2,4,6-trisdimethylaminomethylphenol, polyamidoamine, or dimer diamine is exemplified.

In addition, as the imidazole, there is no particular limitation, but for example, 2-methylimidazole, 1,2-dimethylimidazole, 2-phenylimidazole, 2-undecylimidazole, 2-heptadecylimidazole, 1-isobutyl-2-methylimidazole, 2-phenyl-4-methylimidazole, 2-ethyl-4-methylimidazole, 1-benzyl-2-phenylimidazole, 1-benzyl-2-methylimidazole, 1-cyanoethyl-2-methylimidazole, 1-cyanoethyl-2-phenylimidazole, 1-cyanoethyl-2-undecylimidazole, 2,4-diamino-6(2'-methylimidazole(1'))ethyl-s-triazine, 2,4-diamino-6(2'-undecylimidazole(1'))ethyl-s-triazine, 2,4-diamino-6(2'-ethyl, 4-methylimidazole(1'))ethyl-s-triazine, 2-phenyl-3,5-dihydroxymethylimidazole, 2-phenyl-4-hydroxymethyl-5-methylimidazole, 1-cyanoethyl-2-phenyl-3,5-dicyanoethoxymethylimidazole, or the like is exemplified.

As the polymercaptan, there is no particular limitation, but for example, 3,3'-dithiodipropionic acid, trimethylolpropane tris(thioglycolate), pentaerythritol tetrakis(thioglycolate), ethylene glycol dithioglycolate, 1,4-bis(3-mercaptobutyryloxy) butane, tris [(3-mercaptopropionyloxy)-ethyl]-isocyanurate (TEMPIC), 1,3,5-tris(3-mercaptobutyloxyethyl)-1,3,5-triazine-2,4,6 (1H, 3H, 5H)-trione, trimethylolpropane tris(3-mercaptopropionate) (TMMP), pentaerythritol tetrakis(3-mercaptopropionate) (PEMP), pentaerythritol tetrakis(3-mercaptobutyrate), dipentaerythritol hexakis (3-mercaptopropionate) (DPMP), alkyl polythiol such as 1,4-butanedithiol, 1,6-hexanedithiol, or 1,10-decanedithiol; terminal thiol group-containing polythioether, or the like is exemplified. When polymercaptan is used as the curing agent, curability is remarkably improved by using tertiary amine or the like in combination, which is therefore preferable.

As the acid anhydride compound, there is no particular limitation, but for example, tetrahydrophthalic anhydride, methyltetrahydrophthalic anhydride, hexahydrophthalic anhydride, methylhexahydrophthalic anhydride, methylendoethylenetetrahydrophthalic anhydride, trialkyltetrahydrophthalic anhydride, methylnadic anhydride, phthalic anhydride, trimellitic anhydride, pyromellitic anhydride, maleic anhydride, or the like is exemplified.

Regarding the content of component (d) in the two-component curable resin composition of the present embodiment, with respect to 100 parts by mass of component (a), it is preferable that component (d) is 1 to 150 parts by mass, it is more preferable that component (d) is 1 to 100 parts by mass, and it is further preferable that component (d) is 3 to 50 parts by mass. In addition, when the two-component curable resin composition of the present embodiment contains component (f) described later, with respect to 100 parts by mass of the total amount of component (a) and component (f), it is preferable that the content of component (d) is 1 to 180 parts by mass, it is more preferable that the content is 3 to 140 parts by mass, and it is further preferable that the content is 5 to 100 parts by mass. Within the above range, curability after mixing agent A and agent B becomes good, and storage stability is excellent.

In addition, regarding the content of component (d) in agent B in the two-component curable resin composition of the present embodiment, with respect to 100 parts by mass of component (c), it is preferable that component (d) is 1 to 150 parts by mass, it is more preferable that component (d) is 1 to 100 parts by mass, and it is further preferable that component (d) is 3 to 50 parts by mass. Within the above range, curability after mixing agent A and agent B becomes good, and further storage stability of agent B becomes excellent.

<Component (e)>

Agent A and/or agent B of the two-component curable resin composition according to the present embodiment can contain a silane coupling agent as component (e). When agent A and/or agent B contains a silane coupling agent, storage stability becomes more excellent, and further a cured product having high elongation can be obtained. In addition, it is preferable to include component (e) in both agent A and agent B.

As the silane coupling agent, for example, a glycidyl group-containing silane coupling agent such as 2-(3,4-epoxycyclohexyl)ethyltrimethoxysilane, 3-glycidoxypropyltriethoxysilane, 3-glycidoxypropylmethyldimethoxysilane, glycidylpropyltrimethoxysilane (3-glycidoxypropyltrimethoxysilane), or 3-glycidoxypropylmethyldiethoxysilane; a vinyl group-containing silane coupling agent such as vinyltris(β-methoxyethoxy) silane, vinyltriethoxysilane, or vinyltrimethoxysilane; a (meth)acrylic group-containing silane coupling agent such as γ-methacryloxypropyltrimethoxysilane; an amino group-containing silane coupling agent such as 3-(2-aminoethylamino) propyltrimethoxysilane (N-β-(aminoethyl)-γ-aminopropyltrimethoxysilane), γ-aminopropyltriethoxysilane, or N-phenyl-γ-aminopropyltrimethoxysilane; γ-mercaptopropyltrimethoxysilane, γ-chloropropyltrimethoxysilane, styrylsilane, ureidosilane, sulfidosilane, isocyanatesilane, or the like is exemplified. Among them, as the silane coupling agent, a glycidyl group-containing silane coupling agent, a vinyl group-containing silane coupling agent, or an amino group-containing silane coupling agent is preferable. In addition, it is more preferable that agent A contains a glycidyl group-containing silane coupling agent, and it is further preferable that the glycidyl group-containing silane coupling agent is glycidylpropyltrimethoxysilane. In addition, it is more preferable that agent B contains an amino group-containing silane coupling agent, and it is further preferable that the amino group-containing silane coupling agent is 3-(2-aminoethylamino) propyltrimethoxysilane. Regarding the silane coupling agent, one kind may be used alone, or two or more kinds may be used in combination.

The content of component (e) in agent A is not particularly limited, but with respect to 100 parts by mass of component (a), it is preferable that the content is 0.1 to 20 parts by mass, it is more preferable that the content is 0.2 to 15 parts by mass, and it is further preferable that the content is in the range of 0.3 to 10 parts by mass. Within the above range, storage stability of agent A is even more excellent, and further a cured product having high elongation can be obtained.

Regarding the content of component (e) in agent B, with respect to 100 parts by mass of component (c), it is preferable that the content is 0.1 to 20 parts by mass, it is preferable that the content is 0.2 to 15 parts by mass, and it is particularly preferable that the content is in the range of 0.3 to 10 parts by mass. Within the above range, storage stability of agent B is even more excellent, and a cured product having sufficiently higher elongation can be obtained.

<Component (f)>

Furthermore, the two-component curable resin composition of the present embodiment can contain an aromatic epoxy resin as component (f) in agent A. When agent A contains component (f), a cured product that is quickly cured by mixing agent A and agent B and has sufficiently higher elongation and higher strength is obtained, and a two-component curable resin composition that is excellent in adhesive force to metal can be obtained.

As component (f), there is no particular limitation, but for example, a bisphenol type epoxy resin such as a bisphenol A type epoxy resin, a bisphenol F type epoxy resin, a bisphenol S type epoxy resin, or a bisphenol AD type epoxy resin; a novolac type epoxy resin such as a phenol novolac type epoxy resin or a cresol novolac type epoxy resin; a glycidylamine compound such as N, N-diglycidyl-4-glycidyloxyaniline, 4,4'-methylenebis(N, N-diglycidylaniline), tetraglycidyl diaminodiphenylmethane, or tetraglycidyl-m-xylylenediamine; a naphthalene type epoxy resin, or the like is exemplified. These compounds may be used alone respectively or may be used by mixing two or more kinds.

The content of component (f) in agent A is not particularly limited, but for example, with respect to 100 parts by mass of the total amount of component (a) and component (f), it is preferable that the content is 5 to 95 parts by mass, it is more preferable that the content is 10 to 80 parts by mass, and it is further preferable that the content is 20 to 70 parts by mass. In addition, the content of component (f) in the two-component curable resin composition of the present embodiment is not particularly limited, but for example, with respect to 100 parts by mass of component (c), it is preferable that the content is 5 to 95 parts by mass, it is more preferable that the content is 10 to 80 parts by mass, and it is further preferable that the content is 20 to 70 parts by mass. Within the above range, the two-component curable resin composition can more sufficiently adhere an adherend such as a metal.

<Optional Component>

The two-component curable resin composition according to an embodiment of the present invention can contain additives such as a curing accelerator, a filler, various elastomers such as a styrene-based copolymer, a filling material, a storage stabilizer, an antioxidant, a flame retardant imparting agent, a light stabilizer, a heavy metal deactivator, a plasticizer, an antifoaming agent, a pigment, a rust inhibitor, a leveling agent, a dispersant, a rheology modifier, a flame retardant, and a surfactant as long as the object of the present invention is not impaired.

The curing accelerator that can be contained in the two-component curable resin composition according to an embodiment of the present invention is a curing accelerator that accelerates the reaction between component (a) and component (d). As the curing accelerator, one that is solid at room temperature is preferable, and it is more preferable to use a fine powder obtained by pulverizing an epoxy adduct compound in which tertiary amine is added to a solid compound having an imidazole skeleton or an epoxy resin to stop the reaction in the middle, or the like in consideration of storage stability and curability. As commercially available epoxy adduct-based compounds, AJICURE series Fine-Techno Co., Inc., manufactured by Ajinomoto Fujicure series manufactured by T&K TOKA CO., LTD., NOVACURE series manufactured by Asahi Kasei Chemicals Corporation, and the like are exemplified. In addition, as accelerator that is liquid at room a curing temperature, an organophosphorus compound or the like is known. In addition, regarding the curing accelerator, one kind may be used alone, or two or more kinds may be used in combination.

The two-component curable resin composition according to an embodiment of the present invention can contain a filler for the purpose of improving elastic modulus, fluidity, and the like of the cured product. Specifically, an organic powder, an inorganic powder, a metallic powder, or the like is exemplified.

As the filler of the inorganic powder, glass, fumed silica, mica, ceramics, silicone rubber powder, calcium carbonate, carbon powder, kaolin clay, dry clay mineral, dry diatomaceous earth, or the like is exemplified. In addition, as the filler of the organic powder, for example, polyethylene, polypropylene, nylon, cross-linked acryl, cross-linked polystyrene, polyester, polyvinyl alcohol, polyvinyl butyral, or polycarbonate is exemplified. In addition, as the filler of the metallic powder, gold, silver, copper, alumina, aluminum nitride, or the like is exemplified. The content of the filler is not particularly limited, but it is preferable that the content is 0.1 to 300 parts by mass with respect to 100 parts by mass of component (a) when the filler is contained in agent A, and it is preferable that the content is 0.1 to 300 parts by mass with respect to 100 parts by mass of component (c) when the filler is contained in agent B. Within the above range, a cured product having high elongation and high strength is obtained, and further workability of the two-component curable resin composition can become excellent.

Among the fillers of the inorganic powder, from the viewpoint of improving viscosity adjustment of the two-component curable resin composition or mechanical strength of the cured product, fumed silica can be suitably used. As the fumed silica, fumed silica surface-treated with dimethylsilane, trimethylsilane, alkylsilane, methacryloxysilane, organochlorosilane, polydimethylsiloxane, hexamethyldisilazane, or the like, or the like can be more suitably used. As commercially available products of the fumed silica, for example, AEROSIL R972, R972V, R972CF, R974, R976, R976S, R9200, RX50, NAX50, NX90, RX200, RX300, R812, R812S, R8200, RY50, NY50, RY200S, RY200, RY300, R104, R106, R202, R805, R816, T805, R711, RM50, R7200, or the like (manufactured by NIPPON AEROSIL CO., LTD.), or TS720 (Cabonet Corporation) is exemplified.

As the storage stabilizer, for example, tetrafunctional alkoxysilane such as tetramethoxysilane or tetraethoxysilane, methyltrimethoxysilane, methyltriethoxysilane, silicate compounds typified by ethyl silicate, propyl silicate, and butyl silicate, or the like are exemplified. These may be used alone, or two or more kinds may be used in combination.

The two-component curable resin composition according to an embodiment of the present invention contains agent A and agent B, agent A is a composition containing component (a) and component (b), and agent B is a composition containing component (c) and component (d). By dividing the components into two compositions of agent A and agent B in this manner, it is possible to suppress useless reactions during storage and to enhance storage stability. In such a two-component curable resin composition, agent A and agent B can be produced by being mixed by a well-known method. Then, in use, agent A and agent B can be mixed by a well-known method and used.

In addition, regarding the amount of agent B in the two-component curable resin composition according to an embodiment of the present invention, when agent A is 100 parts by mass, it is preferable that the amount is 10 to 300 parts by mass, it is more preferable that the amount is 30 to 200 parts by mass, and it is further preferable that the amount is 50 to 150 parts by mass.

<Cured Product>

Another embodiment of the present invention is a cured product obtained by curing the two-component curable resin composition described above (cured product of the two-component curable resin composition). The cured product that is another embodiment of the present invention is obtained by mixing agent A and agent B constituting the two-component curable resin composition to cure the two-component curable resin composition.

<Application>

From the two-component curable resin composition of an embodiment of the present invention, a cured product that is excellent in storage stability, is quickly cured by mixing agent A and agent B, and has high elongation and high strength is obtained without using a dibutyltin catalyst, and thus the two-component curable resin composition is preferably used for various applications such as an adhesive, a sealing agent, a sealant, a potting agent, a coating agent, a lining material, a heat dissipation material, and a conductive paste. Among them, the two-component curable resin composition can be suitably used as a structural adhesive because it has excellent adhesive force to an adherend such as a metal while being a cured product having high elongation and high strength. As specific applications of the structural adhesive, there is no particular limitation, but for example, adhesion between panels constituting a door, a pillar, and a roof of an automobile, adhesion between a body and a roof, adhesion of a magnet of a motor, and the like are exemplified.

<Composite>

Another embodiment of the present invention is a composite obtained by adhering an adherend with the two-component curable resin composition.

As the adherend to be adhered with the two-component curable resin composition that is an embodiment of the present invention, there is no particular limitation, but for example, a metal and a metal, a metal and a plastic, a metal and a rubber, a metal and a glass, a plastic and a rubber, a plastic and a glass, a plastic and a plastic, a rubber and a rubber, a rubber and a glass, a glass and a glass, or the like are exemplified. Among them, a metal and a metal, a metal and a plastic, and a plastic and a plastic are preferable.

As the metal, there is no particular limitation, but for example, gold, silver, iron, aluminum, magnesium, copper, stainless steel, titanium, or the like is exemplified. In addition, as the plastic, there is no particular limitation, but for example, fiber reinforced plastic (FRP), carbon fiber reinforced plastic (CFRP), polyacryl, polyester, polyamide, acrylonitrile-butadiene-styrene, nylon 6, polycarbonate, polyacetal, polyethylene terephthalate, polybutylene terephthalate, polyphenylene sulfide, polyphenylene ether, polyether ether ketone, polyethylene, polypropylene, or the like is exemplified. In addition, as the rubber, there is no particular limitation, but for example, nitrile rubber, butyl rubber, urethane rubber, silicone rubber, EPDM, or the like is exemplified. Adhesion between two or more adherends selected at least from these, or the like is exemplified. In addition, the surface of the material may be surface-treated in advance, or may remain untreated.

Examples

Hereinafter, the present invention will be described in more detail with reference to Examples, but the present invention is not limited to these Examples. Incidentally, in the following Examples, unless otherwise specified, operations were performed at room temperature (25° C.).

<Preparation of Two-Component Curable Resin Composition>

Each component shown below was collected in the proportions (parts by mass) shown in Table 1, and mixed with a mixer at normal temperature for 60 minutes to prepare each of agent A and agent B corresponding to a two-component curable resin composition. Incidentally, details of each component are as follows.

<Component (a)>

- a1: hydrogenated bisphenol A type epoxy resin (manufactured by New Japan Chemical Co., Ltd., RIKARESIN (registered trademark) HBE-100)

<Component (b), and Component (b') that is Comparative Component of Component (b)>

- b1: titanium tetraisopropoxide (manufactured by Matsumoto Fine Chemical Co., Ltd., ORGATIX (registered trademark) TA-8, component concentration of 99% by mass or more)
- b2: titanium diisopropoxybis(acetylacetonate) (manufactured by Matsumoto Fine Chemical Co., Ltd., ORGATIX (registered trademark) TC-100, component concentration of 75% by mass or more)
- b3: aluminum catalyst (manufactured by Shin-Etsu Chemical Co., Ltd., DX-9740)
- b'1: dibutyltin compound (manufactured by Nitto Kasei Co., Ltd., NEOSTANN (registered trademark) U-100)
- b'2: titanium diisopropoxybis(ethylacetoacetate) (manufactured by Matsumoto Fine Chemical Co., Ltd., ORGATIX (registered trademark) TC-750, component concentration of 95% by mass or more)
- b'3: zirconium octylate compound (manufactured by Matsumoto Fine Chemical Co., Ltd., ORGATIX (registered trademark) ZC-200, component concentration of 80% by mass or more)

b'4: tetra-n-butyl titanate (manufactured by Matsumoto Fine Chemical Co., Ltd., ORGATIX (registered trademark) TA-25)

b'5: phosphoric acid catalyst (manufactured by Shin-Etsu Chemical Co., Ltd., X-40-2309A)

<Component (c)> c1: polyoxyalkylene containing trimethoxysilyl groups at both terminals (manufactured by KANEKA CORPORATION, SAX-575, liquid at 25° C.)

c2: polyoxyalkylene containing dimethoxysilyl groups at both terminals (manufactured by KANEKA CORPORATION, SAX-750, liquid at 25° C.)

<Component (d)> d1: 2,4,6-tris(dimethylaminomethyl) phenol (manufactured by Air Products Japan K.K., Ancamine (registered trademark) K54, liquid at 25° C.)

<Component (e)> e1: glycidylpropyltrimethoxysilane (manufactured by Shin-Etsu Chemical Co., Ltd., KBM-403)

e2: 3-(2-aminoethylamino) propyltrimethoxysilane (manufactured by Dow Toray Co., Ltd., DOWSIL (registered trademark) Z-6094 Silane)

<Component (f)> f1: bisphenol A type epoxy resin (manufactured by Mitsubishi Chemical Corporation, jER (registered trademark) 828)

Test methods in Examples and Comparative Examples in Table 1 are as follows.

<(1) Storage Stability Test of Agent a of Two-Component Curable Resin Composition>

Each agent A prepared above was filled in a glass container, and stored in a state of being sealed with a environment of lid under an 25° ° C. for 1 month. Thereafter, the container was opened, the container was tilted, and whether or not fluidity existed was visually confirmed, and evaluation was performed based on the following criteria. The results are shown in Table 1.

[Evaluation Criteria]

o: Fluidity of the composition was confirmed.

x: The composition gelled and did not flow.

<Storage Stability Test of Agent B of Two-Component Curable Resin Composition>

Each agent B prepared above was filled in a glass container, and stored in a state of being sealed with a lid under an environment of 25° C. for 1 month. Thereafter, the container was opened, and evaluation was performed based on the following criteria. The results are shown in Table 1.

[Evaluation Criteria]

o: Fluidity of the composition was confirmed.

x: The composition gelled and did not flow.

<(3) Curability after Mixing Agent A and Agent B>

10 g of agent A and 10 g of agent B were mixed under an environment of 25° C. Next, the resin composition after mixing was allowed to stand in an environment of 25° C. and 50% RH for 1 day, 2 days, 3 days, 5 days, and 7 days, and the surface was touched with a metal rod, and curing was confirmed by presence or absence of stickiness. Evaluation was performed based on the following evaluation criteria. The results are shown in Table 1.

[Evaluation Criteria]

⊙: Those confirmed to be cured after 1 day had elapsed o: Those confirmed to be cured after 2 to 7 days had elapsed x: Those confirmed to be uncured after 7 days had elapsed <(4) Measurement of Tensile Strength of Cured Product>

100 g of agent A and 100 g of agent B of each two-component curable resin composition were mixed in an environment at 25° ° C. to obtain a resin composition. Next, the thickness of the resin composition was set to 1 mm, and the resin composition was cured by curing under an environment of 25° C. and 50% RH for 168 hours to prepare a sheet-like cured product. The cured product was punched with a No. 3 dumbbell to prepare a test piece. Both ends of the test piece were fixed to a chuck such that the long axis of the test piece and the center of the chuck were aligned. The test piece was pulled at a tensile speed of 500 mm/min, and the maximum load was measured. The strength at the maximum load was defined as "tensile strength (MPa)". The results are shown in Details are in accordance with JIS K 6251 Table 1. (2010). Incidentally, as sufficient strength that can withstand use as the cured product of the two-component curable resin composition, it is preferable that the tensile strength is 5.0 MPa or more, and it is more preferable that the tensile strength is 6.0 MPa or more. Note that "-" in Table 1 means not performed.

<(5) Method for Measuring Elongation Percentage of Cured Product>

100 g of agent A and 100 g of agent B of each two-component curable resin composition were mixed in an environment at 25° ° C. to obtain a resin composition. Next, the thickness of the resin composition was set to 1 mm, and the resin composition was cured by curing under an environment of 25° C. and 50% RH for 168 hours to prepare a sheet-like cured product. The cured product was punched with a No. 3 dumbbell to prepare a test piece, and marked lines at intervals of 20 mm were drawn on the test piece.

The test piece was fixed to a chuck in the same manner as in the measurement of the tensile strength, and pulled at a tensile speed of 500 mm/min until leading to cutting of the test piece. At the time of measurement, the test piece was elongated and the interval between the marked lines was widened, and thus the interval between the marked lines was measured with a caliper until the test piece was cut. The proportion of elongation, the "elongation percentage (%)", was calculated by dividing the interval (mm) between the marked lines immediately before breaking by the initial marked line interval (20 mm) (elongation percentage (%)=(interval between marked lines immediately before breaking/initial marked line interval)×100). The results are shown in Table 1. Incidentally, as sufficient elongatability that can withstand use as the cured product of the two-component curable resin composition, it is preferable that the elongation percentage is 200% or more, it is more preferable that the elongation percentage is 300% or more, and it is further preferable that the elongation percentage is 350% or more. Note that "-" in Table 1 means not performed.

<(6) Shear Adhesive Strength Test for Metal>

A resin composition obtained by mixing 100 g of agent A and 100 g of agent B of Examples 1, 2, and 4 under an environment of 25° C. was applied to a test piece made of SUS304 of a width of 25 mm×a length of 100 mm×a thickness of 1.6 mm, and thereafter, a test piece made of SUS304 of the same size was bonded so that the adhesive surface was 25 mm in width×10 mm in length and fixed with a clip, and then cured at 25° C.×50% RH for 168 hours to cure the two-component curable resin composition, thereby preparing a test piece.

Both ends of the test piece were fixed, and the strength at the maximum load measured by tension at a tensile speed of 10 mm/min was taken as adhesive force (MPa) to metal. The measurement results are shown in Table 1. The results were 7.4 MPa in Example 1, 8.0 MPa in Example 2, and 12.0 MPa in Example 4, respectively. Incidentally, in the present invention, from the viewpoint of excellent adhesive force to metal, it is preferable that the adhesive force is 6.0 MPa or more, and it is more preferable that the adhesive force is 10 MPa or more. "-" in Table 1 means not performed.

TABLE 1

| | Component | Example 1 | Example 2 | Example 3 | Example 4 | Reference Example 1 | Comparative Example 1 | Comparative Example 2 | Comparative Example 3 | Comparative Example 4 | Comparative Example 5 |
|---|---|---|---|---|---|---|---|---|---|---|---|
| Agent A | a1 | 100 | 100 | 100 | 50 | 100 | 100 | 100 | 100 | 100 | |
| | f1 | | | | 50 | | | | | | 100 |
| | b1 | 4 | | | 4 | | | | | | 4 |
| | b2 | | 4 | | | | | | | | |
| | b3 | | | 4 | | | | | | | |
| | b'1 | | | | | 4 | | | | | |
| | b'2 | | | | | | 4 | | | | |
| | b'3 | | | | | | | 4 | | | |
| | b'4 | | | | | | | | 4 | | |
| | b'5 | | | | | | | | | 4 | |
| | e1 | 1 | 1 | 1 | 1 | 1 | 1 | 1 | 1 | 1 | 1 |
| Agent B | c1 | 50 | 50 | 50 | 50 | 50 | 50 | 50 | 50 | 50 | 50 |
| | c2 | 50 | 50 | 50 | 50 | 50 | 50 | 50 | 50 | 50 | 50 |
| | d1 | 10 | 10 | 10 | 10 | 10 | 10 | 10 | 10 | 10 | 10 |
| | e2 | 2 | 2 | 2 | 2 | 2 | 2 | 2 | 2 | 2 | 2 |
| (1) Storage stability of agent A | | ○ | ○ | ○ | ○ | ○ | X | X | X | ○ | ○ |
| (2) Storage stability of agent B | | ○ | ○ | ○ | ○ | ○ | ○ | ○ | ○ | ○ | ○ |
| (3) Curability after mixing agent A and agent B | | ⊙ | ○ | ⊙ | ⊙ | ⊙ | ○ | ○ | ○ | X | ○ |
| (4) Tensile strength of cured product [MPa] | | 7.5 | 8 | 7.3 | 6.9 | 7.2 | — | — | — | — | 4.3 |
| (5) Elongation percentage of cured product [%] | | 740 | 695 | 490 | 485 | 735 | — | — | — | — | 160 |
| (6) Shear adhesive strength [MPa] | | 7.4 | 8.0 | — | 12.0 | — | — | — | — | — | — |

From the results of Examples 1 to 4 in Table 1, it could be confirmed that the two-component curable resin composition of the present embodiment is excellent in storage stability of agent A and agent B, and is quickly cured by mixing agent A and agent B. In addition, it could be confirmed that a cured product having high elongation and high strength is obtained from the two-component curable resin composition of the present embodiment.

Reference Example 1 is a resin composition that is excellent in curability after mixing and storage stability of each agent constituting the two-component curable resin composition, but is not preferable in consideration of environmental load because it contains a dibutyltin catalyst. Comparative Examples 1 to 4 are resin compositions using the catalysts of b'2 to 5 as component (b') in place of component (b) of the present invention in agent A constituting the two-component curable resin composition, but it is found that storage stability of agent A is poor in Comparative Examples 1 to 3. In addition, in Comparative Example 4, it is found that curability after mixing is poor. Comparative Example 5 is a resin composition not containing component (a) in agent A of the present invention and using f1 in place of it, but is a cured product in which elongation and strength of the cured product are poor.

INDUSTRIAL APPLICABILITY

From the two-component curable resin composition of the present invention, a cured product that is excellent in storage stability, is quickly cured by mixing agent A and agent B, and further has high elongation and high strength is obtained without using a dibutyltin catalyst, and thus the two-component curable resin composition is suitably used for various applications such as an adhesive, a sealing agent, a sealant, a potting agent, a coating agent, and a conductive paste. Therefore, it is industrially useful because it is applicable to a wide field.

The present application is based on Japanese Patent Application No. 2021-65803 filed on Apr. 8, 2021, the disclosure content of which is incorporated herein by reference in its entirety.

The invention claimed is:

1. A two-component curable resin composition comprising the following agent A and agent B:

Agent A: a composition containing component (a) and component (b)

Component (a): a hydrogenated epoxy resin

Component (b): one or more compounds selected from the group consisting of titanium dialkoxybis (acetylacetonate), titanium tetraisopropoxide, tetra-tertiary-butyl titanate, and an aluminum catalyst Agent B: a composition containing component (c) and component (d)

Component (c): an organic polymer having two or more hydrolyzable silyl groups

Component (d): a curing agent for component (a), wherein the component (b) contains titanium dialkoxybis (acetylacetonate).

2. The two-component curable resin composition according to claim 1, comprising 0.1 to 20 parts by mass of the component (b) with respect to 100 parts by mass of the component (c).

3. The two-component curable resin composition according to claim 1, wherein the component (a) is a hydrogenated bisphenol type epoxy resin.

4. The two-component curable resin composition according to claim 1, wherein the component (c) contains an organic polymer having a trimethoxysilyl group.

5. The two-component curable resin composition according to claim 4, wherein the component (c) further contains an organic polymer having a dimethoxysilyl group.

6. The two-component curable resin composition according to claim 1, wherein the component (d) is an amine compound that is liquid at 25° C.

7. The two-component curable resin composition according to claim 1, wherein the titanium dialkoxybis(acetylacetonate) is titanium diisopropoxybis(acetylacetonate).

8. The two-component curable resin composition according to claim 1, wherein the agent A and/or the agent B further contains a silane coupling agent as component (e).

9. The two-component curable resin composition according to claim 1, wherein the agent A further contains an aromatic epoxy resin as component (f).

10. A cured product obtained by curing the two-component curable resin composition according to claim 1.

11. A composite obtained by adhering an adherend with the two-component curable resin composition according to claim 1.

* * * * *